United States Patent
Ferré Fàbregas et al.

(10) Patent No.: US 10,260,983 B2
(45) Date of Patent: Apr. 16, 2019

(54) APPARATUS AND METHOD FOR DIAGNOSTICS OF A CAPACITIVE SENSOR WITH PLAUSIBILITY CHECK

(71) Applicant: Lear Corporation, Southfield, MI (US)

(72) Inventors: Antoni Ferré Fàbregas, Valls (ES); Federico Giordano, Valls (ES)

(73) Assignee: LEAR CORPORATION, Southfield, MI (US)

( * ) Notice: Subject to any disclaimer, the term of this patent is extended or adjusted under 35 U.S.C. 154(b) by 319 days.

(21) Appl. No.: 14/580,800

(22) Filed: Dec. 23, 2014

(65) Prior Publication Data
US 2015/0204963 A1 Jul. 23, 2015

Related U.S. Application Data (60) Provisional application No. 61/929,272, filed on Jan. 20, 2014.

(51) Int. Cl.
| | | |
|---|---|---|
| *G01L 27/00* | (2006.01) | |
| *G01D 5/24* | (2006.01) | |
| *G01D 18/00* | (2006.01) | |

(52) U.S. Cl.
CPC .............. *G01L 27/007* (2013.01); *G01D 5/24* (2013.01); *G01D 18/00* (2013.01)

(58) Field of Classification Search
CPC ....... G01R 35/00; G01R 35/005; G01R 27/26
See application file for complete search history.

(56) References Cited

U.S. PATENT DOCUMENTS

| | | | |
|---|---|---|---|
| 4,184,112 A | 1/1980 | Cox | |
| 4,825,147 A | 4/1989 | Cook et al. | |
| 4,931,721 A | 6/1990 | Berrigan et al. | |
| 6,194,903 B1* | 2/2001 | Schulz | G01D 5/24 324/661 |
| 6,356,086 B1 | 3/2002 | Cook et al. | |
| 8,004,288 B1 | 8/2011 | Sherwood et al. | |
| 8,179,156 B2 | 5/2012 | Horsky et al. | |
| 2004/0088661 A1* | 5/2004 | Anderson | G06F 17/5036 716/115 |
| 2006/0238205 A1* | 10/2006 | Francis | G01D 5/2405 324/658 |
| 2006/0267599 A1 | 11/2006 | Pooranakaran et al. | |

(Continued)

FOREIGN PATENT DOCUMENTS

| | | |
|---|---|---|
| EP | 0506655 A1 | 10/1992 |
| EP | 0704706 A1 | 4/1996 |

(Continued)

*Primary Examiner* — Giovanni Astacio-Oquendo
*Assistant Examiner* — Alvaro Fortich
(74) *Attorney, Agent, or Firm* — Brooks Kushman P.C.

(57) ABSTRACT

In at least one embodiment, an apparatus for diagnosing a state of a capacitive sensor is provided. The apparatus comprises a measuring circuit for being electrically coupled to a capacitive sensor. The measuring circuit is configured to measure a first impedance of the capacitive sensor at a first frequency and to determine a first capacitance of the capacitive sensor at the first frequency based on the first impedance. The measuring circuit is further configured to compare the first capacitance of the capacitive sensor to a first threshold and to a second threshold to diagnose the capacitive sensor.

17 Claims, 4 Drawing Sheets

(56) References Cited

U.S. PATENT DOCUMENTS

| | | | |
|---|---|---|---|
| 2007/0001688 A1* | 1/2007 | Schnelder | G01R 31/312 324/605 |
| 2007/0176609 A1* | 8/2007 | Ely | G06F 3/044 324/678 |
| 2008/0042994 A1* | 2/2008 | Gillespie | G06F 3/03547 345/174 |
| 2008/0150553 A1* | 6/2008 | Yakabe | H04R 3/00 324/686 |
| 2010/0043531 A1 | 2/2010 | Garrard et al. | |
| 2010/0079510 A1 | 4/2010 | DiBiase et al. | |
| 2010/0156839 A1* | 6/2010 | Ellis | G06F 1/3203 345/174 |
| 2011/0050617 A1* | 3/2011 | Murphy | G06F 3/0418 345/174 |
| 2011/0050620 A1* | 3/2011 | Hristov | G06F 3/0416 345/174 |
| 2011/0080181 A1* | 4/2011 | Sato | A61B 5/0537 324/692 |
| 2011/0120784 A1* | 5/2011 | Osoinach | G06F 3/044 178/18.06 |
| 2011/0316558 A1* | 12/2011 | Pfaffinger | G01D 5/243 324/603 |
| 2012/0176179 A1* | 7/2012 | Harders | H03K 17/962 327/517 |
| 2012/0268139 A1* | 10/2012 | Fend | G01F 23/24 324/601 |
| 2012/0299602 A1 | 11/2012 | Chiu et al. | |
| 2012/0319994 A1* | 12/2012 | Hatano | G06F 3/044 345/174 |
| 2013/0090873 A1* | 4/2013 | Lundstrum | H03K 17/962 702/64 |
| 2013/0152663 A1* | 6/2013 | Balachandran | G01L 25/00 73/1.38 |
| 2013/0187664 A1* | 7/2013 | Deumal Herraiz | G01D 18/00 324/548 |
| 2013/0194230 A1* | 8/2013 | Kawaguchi | G06F 3/0416 345/174 |
| 2013/0258753 A1* | 10/2013 | Gopinath | G11C 13/004 365/148 |
| 2015/0185909 A1* | 7/2015 | Gecnuk | G06F 3/044 345/174 |

FOREIGN PATENT DOCUMENTS

FR    2912817 A1    8/2008
WO    0133245 A1    5/2001

* cited by examiner

APPARATUS AND METHOD FOR DIAGNOSTICS OF A CAPACITIVE SENSOR WITH PLAUSIBILITY CHECK

CROSS-REFERENCE TO RELATED APPLICATIONS

This application claims the benefit of U.S. provisional application Ser. No. 61/929,272 filed Jan. 20, 2014, the disclosure of which is hereby incorporated in its entirety by reference herein.

TECHNICAL FIELD

Embodiments disclosed herein generally relate to an apparatus and method for diagnostics of a capacitive sensor.

BACKGROUND

It may be desirable to perform diagnostics on a capacitive sensor. One example, of performing diagnostics on a capacitive sensor is set forth in U.S. Publication No. 2010/0043531 (the "531 publication") to Garrard et al.

The '531 publication provides a detector circuit for detecting the presence of a remote capacitive sensor having at least two terminals connected via a protection circuit that includes one or more capacitors. The detector circuit comprises a current supply for changing the charge on the sensor and the protection circuit and a detector for measuring the voltage on one or more of the terminals. The presence of the sensor is determined by changing the charge on the capacitive sensor and the one or more capacitors of the protection circuit in a predetermined manner such that the voltage measurement on the one or more terminals when the sensor is present is significantly different than when the sensor is absent.

SUMMARY

In at least one embodiment, an apparatus for diagnosing a state of a capacitive sensor is provided. The apparatus includes a measuring circuit for being electrically coupled to a capacitive sensor. The measuring circuit is configured to measure a first impedance of the capacitive sensor at a first frequency and to determine a first capacitance of the capacitive sensor at the first frequency based on the first impedance. The measuring circuit is further configured to compare the first capacitance of the capacitive sensor to a first threshold and to a second threshold to diagnose the capacitive sensor.

In at least another embodiment, a method for diagnosing a state of a capacitive sensor is provided. The method includes measuring a first impedance of the capacitive sensor at a first frequency and determining a first capacitance of the capacitive sensor at the first frequency based on the first impedance. The method further includes comparing the first capacitance of the capacitive sensor to a first threshold and to a second threshold to diagnose the capacitive sensor.

In at least another embodiment, an apparatus for diagnosing a state of a capacitive sensor is provided. The apparatus includes a measuring circuit for being electrically coupled to a capacitive sensor. The measuring circuit being configured to measure a first impedance of the capacitive sensor at a first frequency and to measure a second impedance of the capacitive sensor at a second frequency while simultaneously measuring the first impedance. The measuring circuit is further configured to determine a first capacitance of the capacitive sensor at the first frequency based on the first impedance and to set the first capacitance at the first frequency as a reference capacitance. The measuring circuit is further configured to determine a second capacitance of the capacitive sensor at the second frequency based on the second impedance and to compare the second capacitance of the capacitive sensor to a first threshold that includes the reference capacitance and a first programmable value and to a second threshold that includes the reference capacitance and a second programmable value to diagnose the capacitive sensor.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Various aspects noted herein generally provide for an apparatus and method to diagnose capacitive sensor(s) that are connected to a measuring circuit through a decoupling device. Various characteristics of the present disclosure may include: (i) diagnosis that is performed via digital signal processing (DSP) techniques in the frequency domain, this may introduce large flexibility, as any frequency (or combination of frequencies) in the operating range of the measuring circuit may be used, and (ii) no need to require the use of calibrating the decoupling device during life time and may ensure that an error in the diagnosis of the capacitive sensor is within a predefined range.

One aspect may be to determine a parallel resistance that a sensor (and/or element) with a capacitive behavior has in order to diagnose the leakage due to a variation of such parallel resistance. Various embodiments may be used to monitor failures in systems such as, but not limited to, seat occupancy detection with capacitive sensors (e.g., automotive industry) or systems with using large decoupling capacitors (e.g., as $C_y$ capacitors in automotive (or vehicle) high voltage (HV) systems).

Figure 1:
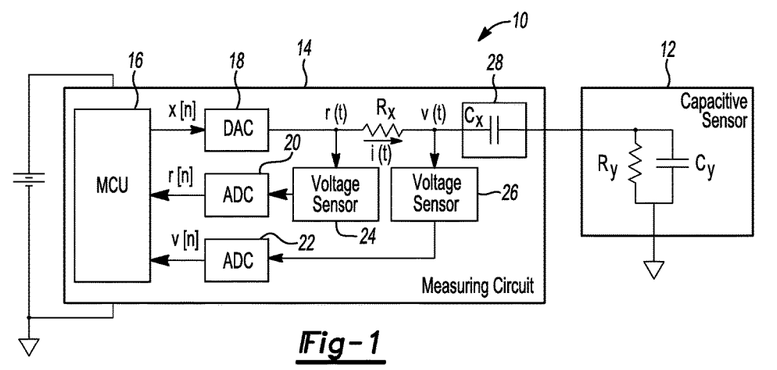
FIG. 1 depicts an apparatus for diagnosing a capacitive sensor in accordance to one embodiment.

FIG. 1 depicts an apparatus 10 for diagnosing a capacitive sensor 12 in accordance to one embodiment. The apparatus 10 includes a measuring circuit 14 for diagnosing the capacitive sensor 12. The measuring circuit 14 includes a microcontroller unit (MCU) 16 that is configured to generate a command signal in the digital domain (e.g., x[n]) and to determine an impedance of the capacitive sensor 12 by measuring signals (e.g., r[n], a reference signal) and (e.g., v[n], a voltage signal), and to apply a DSP technique for measuring the same. A digital to analog converter (DAC) 18 is configured to convert a digital version of the command signal, x[n] into a corresponding analog signal x(t). A first analog to digital converter (ADC) 20 is configured to convert the analog based signal of the reference signal (e.g. r(t)) into a corresponding digital signal of r[n]. A second ADC 22 is configured to convert the analog based signal of v(t) into a corresponding digital signal v[n].

A first voltage sensor 24 is generally configured to sense the signal of r(t) in the analog domain. In addition, a second voltage sensor 26 is generally configured to sense the signal of v(t) in the analog domain. Such signals may be sensed by the first voltage sensor 24 and the second voltage sensor 26 with a large impedance isolation to prevent error from being introduced into the measured impedance. A decoupling device 28 such as a capacitor ($C_x$) is provided to decouple the capacitive sensor 12 from the measuring circuit 14. For example, the decoupling device 28 is generally arranged to prevent a transfer of energy from the measuring circuit 14 to the capacitive sensor 12. The decoupling device 28 of FIG. 1 is generally arranged as a half decoupling circuit where a common ground is used between the capacitive sensor 12 and the measuring circuit 14.

Figure 2:
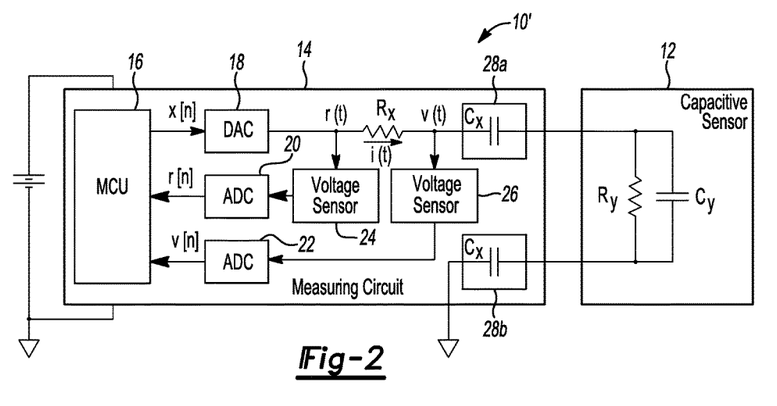
FIG. 2 depicts an apparatus for diagnosing a capacitive sensor in accordance to one embodiment.

FIG. 2 generally depicts an apparatus 10' that is similar to the apparatus 10 of FIG. 1. However, the apparatus 10' provides a decoupling device 28a-28b ("28") in the form of a full decoupling circuit where the capacitive sensor 12 is totally isolated from the measuring circuit 14. In general, it is contemplated that the decoupling device 28 may not need calibration during its lifetime. It is also recognized that an error in the diagnosis of the capacitive sensor 12 is generally within a predefined range. The capacitive sensor 12 is generally modeled as a resistance that is in parallel with a capacitor $C_x$.

The apparatus 10 and 10' may be configured to: (i) measure an overall impedance of the capacitive sensor 12 in addition to the decoupling device 28 and (ii) determine a value of $R_y$ and $C_y$ of the capacitive sensor 12 within a predefined error without the need to calibrate the decoupling device 28. In general, the value of $R_y$ and $C_y$ are calculated by the MCU 16 by applying Ohm's law based on the signals x[n], y[n], and v[n].

Figure 3:
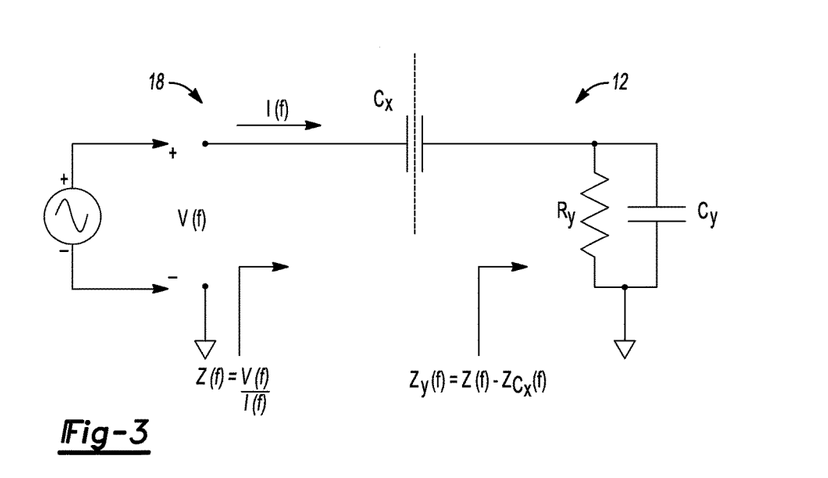
FIG. 3 depicts a block diagram implementation representing the apparatus of FIG. 1.

FIG. 3 depicts a block diagram implementation representing the apparatus 10 of FIG. 1. To measure the overall impedance, the apparatus 10 generates the signal (e.g., x[n]) that is made up of one or several subcarriers, at desired frequencies and performs a frequency domain analysis of the voltage and current signals (e.g., v(t) and r(t), respectively) before the decoupling device 28. In other words, the measured overall impedance is calculated using the values of voltage (e.g., V as shown in FIG. 3) and current (e.g., I as shown in FIG. 3) as shown to the left of $C_y$ (e.g., the decoupling circuit 28).

In general, the notion of generating a multicarrier signal enables one to determine an overall impedance at different frequencies so that the apparatus 10, 10' may determine which are the most appropriate frequencies to be used in order to determine the value of the elements $R_y$ and $C_y$. This may include (i) discarding those frequencies where interference is present (e.g., for instance, in case an AC power signal is present, the apparatus 10, 10' may detect that an interference at 50 Hz (or 60 Hz) is present and automatically discard this frequency) and/or (ii) discarding frequencies where undesired circuit responses may introduce large errors in the measurements may occur.

The generated signal of x(t) comprises N orthogonal subcarriers, as follows:

$$x(t) = \sum_{k=-N/2}^{N/2-1} X_k \cdot e^{j2\pi f_k t}, 0 \le t < T_S,$$

where $X_k$ is the amplitude of the subcarrier at frequency $f_k = k/T_S$ and $T_S$ is the duration of the signal. The amplitude of each subcarrier may allow (i) $X_k$ to take the value of 0 if the subcarrier is not used and $\{-1,1\}$ if the subcarrier is used, or (ii) for the signal x(t) to be a real-value, the subcarrier amplitudes should be symmetric: $X_k = X_{-k}^*$, (e.g., Hermitian symmetric) where the asterisk denotes a complex conjugate.

Since the signal x[n] is generated by the MCU 16, a discrete (digital) formulation may be used instead of the continuous (analog) one as provided directly above. For example, x[n] may be used to denote the time domain signal x(t) in the digital domain and $X_k$ may be used to denote the frequency domain signal in the digital domain. It can be shown that x[n] can be obtained by taking the $N/N_S$-scaled inverse discrete Fourier Transform (IDFT) of the vector constituted by $\{X_k\}$: $[X_0, X_1, \ldots, X_{N-1}]$:

$$x[n] = \frac{1}{N_s} \sum_{k=0}^{N-1} X_k e^{\frac{j2\pi kn}{N}}, n = 0, 1, \ldots, N-1,$$

where $N_S$ is the number of active subcarriers (e.g., with an amplitude different than zero) and N is the IDFT size.

The signal x[n] is composed by (at least two) sinusoids at different frequencies. The frequencies chosen are separated enough (preferably by one or more decades) so as to produce a significant change in impedance response of the capacitive sensor allowing the apparatus to perform several measures of the higher frequency for each measure at low frequency. For instance, $f_L = 1$ Hz and $f_H = 10$ Hz allows the apparatus to measure at $f_H$ for each measure at $f_L$.

To potentially avoid an initial transitory state and, hence, to ensure that the impedance is computed in the steady-state, a cyclic prefix of length $N_{cp}$ is added at the beginning of the signal. This may be completed by simply copying the last samples of the generated time domain signal to the beginning. The length of the cyclic prefix, $N_{cp}$, shall be chosen so that $N_{cp} \cdot T_S$ is larger than the initial transitory.

To measure the overall impedance of the capacitive sensor 12, the apparatus 10, 10' may need to (i) obtain the corresponding voltage and current signals at the input of the decoupling device 28, (ii) discard the first $N_{cp}$ samples, (iii) transform the remaining signals to the frequency domain (e.g., v[n] and drip, and (iv) determine the impedance of the capacitive sensor 12 at the given frequencies by dividing the corresponding voltage and current values. For example, let us define r[n], n∈[0, N−1] and v[n], n∈[0, N−1] as the reference signal (e.g., from the output of the DAC 18) and the voltage signal (e.g., at the input of the decoupling device 28), respectively, within the DFT window (see FIGS. 1 and 2). Thus, the impedance of the capacitive sensor 12 may be computed as follows:

1. Determine the input current as $i[n]=(r[n]-v[n])/R_x$
2. Convert the voltage signal to the frequency domain by way of the $N_S/N$-scaled DFT:

$$V[k] = \frac{N_s}{N}\sum_{n=0}^{N-1} v[n] \cdot e^{-j2\pi kn/N}, k \in Q$$

where Q is a set of subcarrier indices with an amplitude that is different than zero and with values in the range [0, N/2].

3. Convert the current signal to the frequency domain by way of the $N_S/N$-scaled DFT:

$$I[k] = \frac{N_s}{N}\sum_{n=0}^{N-1} i[n] \cdot e^{-j2\pi kn/N}, k \in Q$$

4. Determine an overall impedance for the capacitive sensor 12 at subcarrier k as:

$$Z[k] = \frac{V[k]}{I[k]}, k \in Q$$

It is recognized that co-pending U.S. application Ser. No. 13/286,174 ("the '174 application") filed on Oct. 31, 2011 also discloses at least one implementation for determining the impedance. The implementation as set forth in the '174 application is hereby incorporated by reference in its entirety.

Generally, the number of subcarriers may be smaller than the DFT size. Hence, to reduce the computational complexity, it may not be necessary to take the whole DFT (or FFT). Rather, the complex amplitude may be computed at the desired subcarriers. Moreover, since the discrete time domain signals r[n] and v[n] are real, it follows that the frequency domain signals are Hermitian symmetric. Hence, it is sufficient to compute the complex amplitudes of the subcarriers with an index in the range [0, N/2]. Taking this into account, the apparatus 10, 10' may determine the overall impedance of the capacitive sensor 12 as follows:

1. Determine the input current as $i[n]=(r[n]-v[n])/R_x$
2. Determine a complex amplitude of the voltage signal at the $N_S$ frequency components by projecting it into each DFT coefficient vector $w^{q_k}$:

$$V[q_k] = \sum_{n=0}^{N-1} v[n] \cdot w^{q_k}[n], k = [1, 2, \ldots, N_s]$$

where $w^{q_k}=[w^{q_k}[0], w^{q_k}[1], \ldots, w^{q_k}[N-1]]$ and $$w^{q_k}[n] = \frac{N_s}{N} e^{-j2\pi q_k n/N}.$$

3. Determine a complex amplitude of the current signal at the $N_S$ frequency components by projecting it into each DFT coefficient vector $w^{q_k}$:

$$I[q_k] = \sum_{n=0}^{N-1} i[n] \cdot w^{q_k}[n], k = [1, 2, \ldots, N_s]$$

4. Determine an overall impedance at the $N_S$ frequency components as:

$$Z[q_k] = \frac{V[q_k]}{I[q_k]}, k = [1, 2, \ldots, N_s]$$

Alternatively, following the linearity property of the Fourier transform, the apparatus 10, 10' may determine the impedance as:

$$Z[q_k] = \frac{V[q_k] \cdot R_x}{R[q_k] - V[q_k]}, k = [1, 2, \ldots, N_s] \quad \text{(Eq. A)}$$

which may result in a reduced computational complexity. The term $R[q_k]$ is the complex amplitude of the reference signal at the $N_S$ frequency components that is calculated by projecting it into each DFT coefficient vector $w^{q_k}$.

Once the overall impedance of the capacitive sensor 12 plus the decoupling device(s) 28, 28a and/or 28b is measured and calculated at each frequency present in r[n], the value of the elements $R_y$ and $C_y$ at each frequency k is determined, namely $R_y[k]$ and $C_y[k]$. Then, the final values $R_y$ and $C_y$ may be computed by different methods such as averaging.

When computing the actual values of $R_y$ and $C_y$ in the presence of a noisy environment, it is often required to "qualify" the measurement (e.g., determine if the result obtained is valid or not). Although this may not be possible in all circumstances, it may be possible to determine if the result is "plausible" or not. The embodiments disclosed herein provide, among other things, a method to qualify the measurement of $R_y$ and $C_y$ as being plausible or not.

Figure 5:
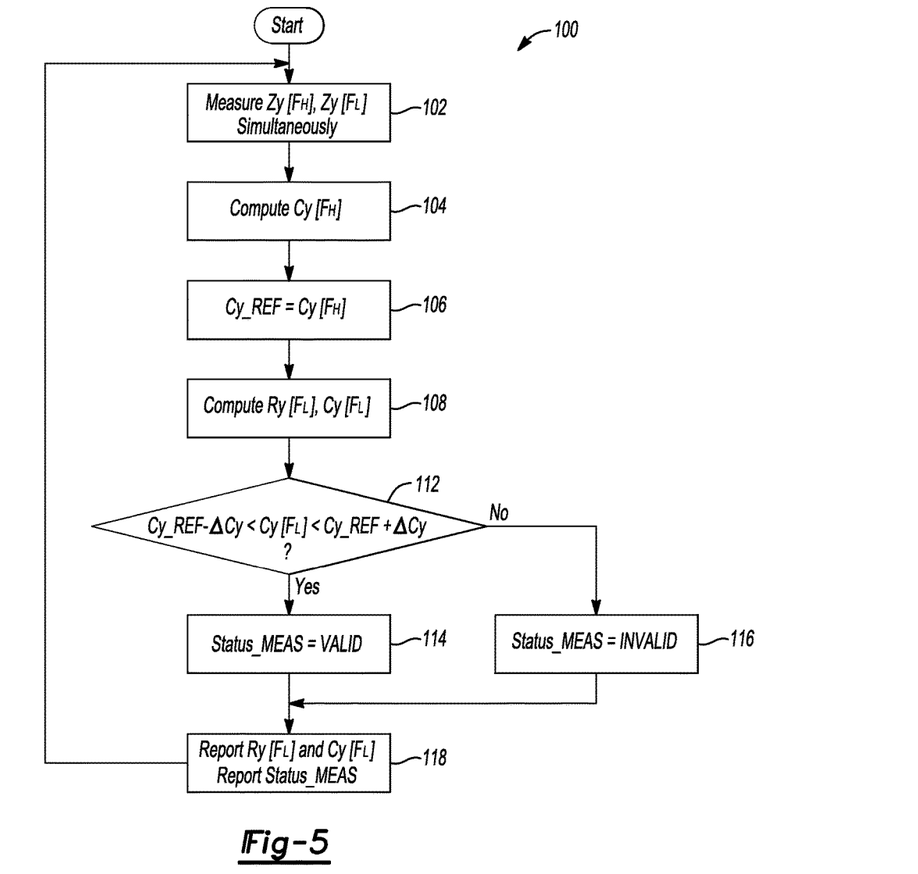
FIG. 5 depicts a second method for performing plausibility of the measurement of the capacitor sensor.
Figure 6:
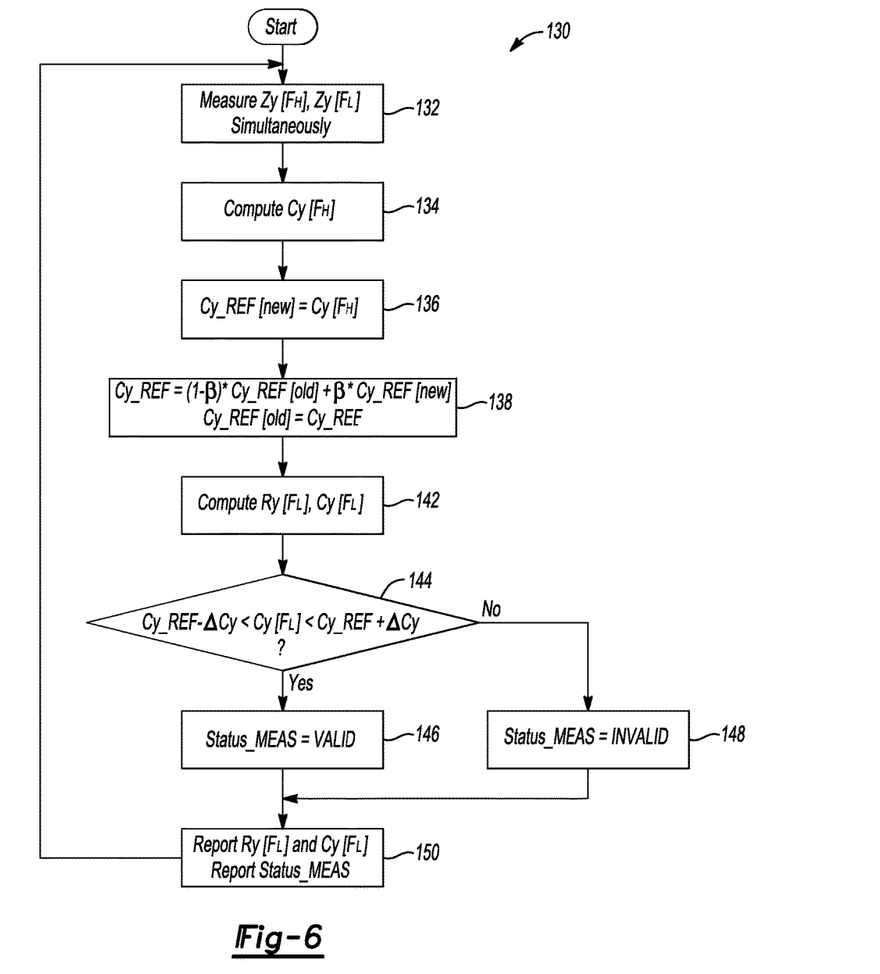
FIG. 6 depicts a third method for performing plausibility of the measurement of the capacitor sensor.

In some cases, the value of $C_y$ under specific conditions is known. For example, in high-voltage systems, the value of capacitors connected between high-voltage powernets and a low-voltage ground is fixed. In this use case, the model as shown in FIG. 2 includes the capacitance and the isolation resistance between the high-voltage powernets and the low-voltage ground. Thus, the fixed value of the capacitor $C_y$ is defined as $C_{y\_REF}$. $C_{y\_REF}$ is used as a reference for the diagnostics of the capacitance. In general, the quality of the measurement as set forth herein may be computed by comparing a measured $C_y$ with the reference value $C_{y\_REF}$. It is recognized that $C_{y\_REF}$ may be different for each vehicle and/or platform or that varies $C_{y\_REF}$ with aging. Accordingly, while this condition may be beneficial in some regards, it is possible to improve on this condition. The methods as set forth in connection FIGS. 4-6 provide embodiments that perform a plausibility check of the capacitive sensor 12.

Figure 4:
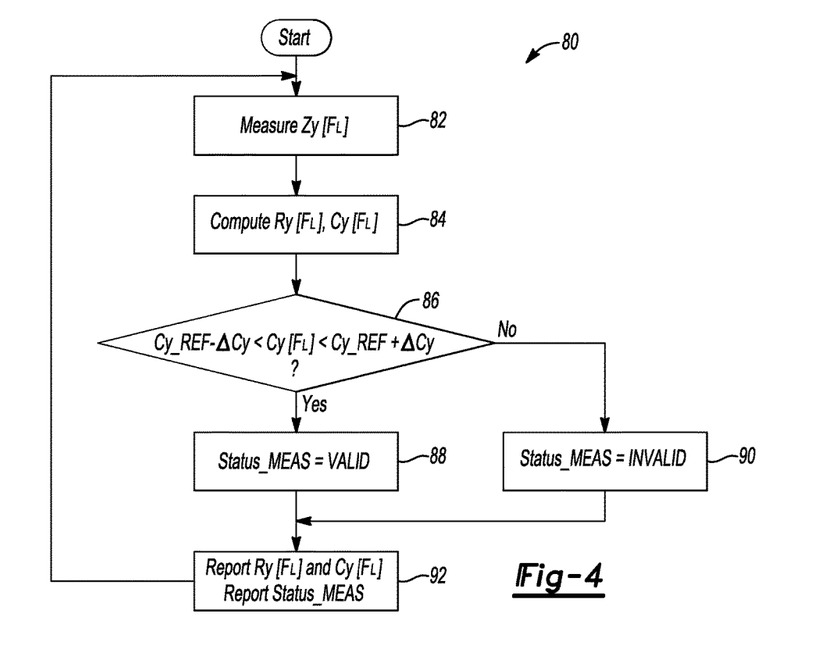
FIG. 4 depicts a first method for performing plausibility of the measurement of the capacitor sensor.

FIG. 4 depicts a first method 80 for performing plausibility of the measurement of the capacitor sensor 12.

In operation 82, the measuring circuit 14 measures the impedance $Z_y[f_L]$ as noted in connection with FIG. 3 at a low frequency.

In general, the impedance of a circuit (e.g., Z) is a function of, or varies with the frequency of current and voltage. As such, we can define Z as Z[f], where f is the variable corresponding to the frequency of current and voltage. FIG. 3 depicts the mathematical formula for $Z_y[f]$ and $Z_{Cx}[f]$. It is noted that $f_L$ (e.g., 1 Hz) and $f_H$ (e.g., 10 Hz) are particular values of the working frequency f variable. Hereafter, specific values for the working frequency are provided. This is indicated with $f_L$ and $f_H$ $$Z(f) = \frac{V(f)}{I(f)} \quad (1)$$

$$Z_y(f) = Z(f) - Z_{cx}(f) \quad (2)$$

$$\begin{cases} Z_{cx}(f) = \dfrac{1}{j2\pi f c_x} \\ Z_y(f) = \dfrac{R_y \dfrac{1}{j2\pi f C_y}}{R_y + \dfrac{1}{j2\pi f C_y}} \end{cases} \quad (3)$$

It should be noted that f corresponds to either a low frequency $f_L$ or a high frequency $f_H$. The appropriate frequency (e.g., high or low) will be set forth in the corresponding operations of FIGS. 4-6.

Thus, the impedance $Z_y[f]$ (or $Z_y[f_L]$) can be found from equation (1) as set forth above. The measuring circuit 14 may also determine the impedance of the decoupling circuit 28, $Z_{Cx}(f)$, where $C_x$ is a preset value that may vary based on the desired criteria of a particular implementation. Once $Z_{Cx}(f)$ is known, the measuring circuit 14 can then determine $R_y[f_L]$ (or $R_y[f_H]$) or $C_y[f_L]$ (or $C_y[f_H]$) as noted below from equation (3) above.

In operation 84, the measuring circuit 14 computes the resistance $R_y[f_L]$ and the capacitance $C_y[f_L]$ from $Z_y[f_L]$ in the manner noted above.

In operation 86, the measuring circuit 14 determines whether the capacitance $C_y[f_L]$ from operation 84 is greater than $C_{y\_REF}-\Delta C_y$ (e.g., a first threshold) and less than $C_{y\_REF}+\Delta C_y$ (e.g. a second threshold). If this condition is true, then the method 80 moves to operation 88. If not, then the method 80 moves to operation 90.

In operation 88, the measuring circuit 14 indicates that the resistance $R_y[f_L]$ measurement is valid. For example, in the event the capacitance $C_y[f_L]$ is greater than $C_{y\_REF}-\Delta C_y$ and less than $C_{y\_REF}+\Delta C_y$ (see operation 86), this condition implies that the resistance $R_y[f_L]$ measurement is valid.

In general, the method 80 determines if the measurement process is valid (or correct). Or, in other words, if the result obtained after the measurement of FIG. 4 and the computation described in FIG. 3 (or in operation 84) is the same (or approximate), then it can be presumed that the status of the measurement of the capacitive sensor 12 is valid.

In operation 90, the measuring circuit 84 indicates that the measurement of the resistance $R_y[f_L]$ is invalid. In general, after the measurement is considered valid, then the measuring circuit 84 may evaluate the capacitor sensor 12. A damaged state (or the fault) corresponds to a low resistance $R_y[f_L]$ (or a low impedance). In this state, current will flow to the resistor $R_y$.

In operation 92, the measuring circuit 14 transmits at least one signal to indicate that the resistance $R_y[f_L]$ and the capacitance $C_y[f_L]$ are valid. Additionally, the measuring circuit 14 may provide either a valid status of an invalid status for $R_y[f_L]$ over a data communication bus to another microcontroller on the vehicle or to a diagnostic tool.

In general, while the method 80 is beneficial, it is recognized that $C_{y\_REF}$ may change over time due to aging and that $C_{y\_REF}$ may be different for each vehicle and/or program. For example, consider the case of a high-voltage system, the value of capacitors connected between the high-voltage powernets and the low-voltage ground is fixed (this is a case corresponding to the apparatus 10' shown in FIG. 2). Additionally, one may consider a capacitive system for a proximity sensor. Due to aging over time, the dielectric in the capacitor (e.g., $C_y$) may degrade and, therefore, the value will change.

Accordingly, while the operation of FIG. 4 may be beneficial, it may be possible to improve on the implementation of FIG. 4. One may consider employing the methods 100, 130 as set forth in connection with FIG. 5 and FIG. 6, respectively, if so desired.

FIG. 5 depicts a second method 100 for performing plausibility of the measurement of the capacitor sensor 12.

The method 100 of FIG. 5 recognizes the following conditions. Due to the inherent characteristics of a capacitive sensor 12, the capacitance of $C_y[f_H]$ computed at frequency $f_H$ is obtained with higher accuracy respect to $C_y[f_L]$, this is particularly true when several measurements are taken and the corresponding computations are averaged in an interval of time. On the other hand, $R_y[f_H]$ is computed with little accuracy, due to the impedance response of capacitive sensor 12 and therefore, the RAN is discarded.

In parallel, values for $C_y[f_L]$ and $R_y[f_L]$ are also computed. Since these results are computed using the same input signal, any noise present will affect both computations. Then, in order to assess the plausibility of $R_y[f_L]$, the method 100 compares $C_y[f_L]$ with $C_y[f_H]$ (e.g., it is known that $C_y[f_H]$ is measured with higher accuracy). If $C_y[f_L]$ is found to be in the range $C_y[f_H] \pm \Delta C_y$, where Cy and $\Delta C_y$ are programmable parameters, the value $R_y[f_L]$ is considered plausible. If the value $C_y[f_L]$ is found to be outside of the foregoing range, then the measurement is considered implausible.

Notice that the method 100 may be generalized to, by using "n" low frequencies" and "m" high frequencies and obtain the mentioned values as an average. For example, if "m" high frequencies (e.g., labeled as $f_{H\_i}$) and "n" low frequencies (e.g., labeled as $f_{L\_j}$) to generate x[n], the value $C_y[f_H]$ is obtained as:

$$C_y[f_H] = \frac{1}{m}\sum_{i=1}^{m} C_y[f_{H\_i}]$$

while the value of $C_y[f_L]$ is obtained as:

$$C_y[f_L] = \frac{1}{n}\sum_{j=1}^{n} C_y[f_{L\_j}]$$

and the value of $R_y[f_L]$ is obtained as:

$$R_t[f_L] = \frac{1}{n}\sum_{j=1}^{n} R_y[f_{L\_j}]$$

With the method 100, a more robust implementation may be realized through the use of at least two measurements at different frequencies. To do this, a signal (as described in Section 1) with at least two components (e.g., one low frequency $f_L$ and another one with high frequency $f_H$) may be used.

In operation 102, the measuring circuit 14 measures the impedance $Z_y[f_H]$ at a high frequency in the manner noted above (see equations (1)-(3) above). In addition, the measuring circuit 14 may simultaneously measure the impedance $Z_y[f_l]$ at a low frequency (see also equations (1)-(3) above). In this case, it may be necessary to assure the measurements (i.e., measuring the impedance $Z_y[f_H]$ and $Z_y[f_l]$ be performed simultaneously so a correlation between high and low frequencies can be established, especially in embedded environments with fast changing operating conditions and/or high electrical noise.

In operation 104, the measuring circuit 14 calculates (or determines) the capacitance $C_y[f_H]$ based on the measured impedance $Z_y[f_H]$. In general, as the frequency increases, it is possible to measure the capacitance better.

In operation 106, the measuring circuit 14 sets the capacitance $C_y[f_H]$ to $C_{y\_REF}$.

In operation 108, the measuring circuit 14 computes the resistance $R_y[f_L]$ and the capacitance $C_y[f_L]$ from $Z_y[f_L]$.

In operation 112, the measuring circuit 14 determines whether the capacitance $C_y[f_L]$ from operation 110 is greater than a first threshold such as $C_{y\_REF}-\Delta C_y$, where $\Delta C_y$ is a programmable value) and less than a second threshold such as $C_{y\_REF}+\Delta C_M$. If this condition is true, then the method 100 moves to operation 114. If not, then the method 100 moves to operation 118.

In operation 114, the measuring circuit 14 indicates that the resistance $R_y[f_L]$ is valid. For example, in the event the capacitance value $C_y[f_L]$ is greater than $C_{y\_REF}-\Delta C_y$ and less than $C_{y\_REF}+\Delta C_M$ (see operation 112), then this condition implies that the resistance $R_y[f_L]$ is valid.

In operation 118, the measuring circuit 14 transmits at least one signal that the resistance $R_y[f_L]$ and the capacitance $C_y[f_L]$ are valid. Additionally, the measuring circuit 14 may provide a valid status or an invalid status for $R_y[f_L]$ over a data communication bus to another microcontroller on the vehicle or to a diagnostic tool.

In operation 116, the measuring circuit 14 indicates that the resistance $R_y[f_L]$ is invalid.

Notice that the method 100 may be easily generalized to by using "n" low frequencies" and "m" high frequencies and obtain the mentioned values as an average. For instance, if "m" high frequencies (labeled as $f_{H\_i}$) and "n" low frequencies (labeled as $f_{L\_j}$) to generate x[n], the value $C_y[f_H]$ is obtained as:

$$C_y[f_H] = \frac{1}{m}\sum_{i=1}^{m} C_y[f_{H\_i}]$$

while the value of $C_y[f_L]$ is obtained as:

$$C_y[f_L] = \frac{1}{n}\sum_{j=1}^{n} C_y[f_{L\_j}]$$

and the value of $R_y[f_L]$ is obtained as:

$$R_y[f_L] = \frac{1}{n}\sum_{j=1}^{n} R_y[f_{L\_j}]$$

The method 130 as disclosed herein (see below) may also include providing a graded/weighted measure of quality rather than a binary statement of validity. In this way the allowed error (e.g., $\Delta C_M$) may range from a lower limit up to a higher limit in several (p) steps defining a set of bins ($\Delta C_y^k$) and assign a weight ($w_k$) to the bins for k={1 ... p}, representing the quality of the measurement. Firstly, the weight assignment is made as follows.

If $$C_y[f_H]-\Delta C_y^k < C_y[f_{L\_j}] < C_y[f_H]+\Delta C_y^k$$

Then, $$R_y[f_{L\_j}] \leftarrow w_k$$

And $$C_y[f_{L\_j}] \leftarrow w_k$$

Finally, the final values are computes as:

$$C_y[f_H] = \frac{1}{m}\sum_{i=1}^{m} C_y[f_{H\_i}]$$

While $$C_y[f_L] = \frac{1}{\sum_{k=0}^{p} w_k}\sum_{j=1}^{n} w_j \cdot C_y[f_{L\_j}]$$

And $$R_y[f_L] = \frac{1}{\sum_{k=0}^{p} w_k}\sum_{k=1}^{n} w_j \cdot R_y[f_{L_j}]$$

FIG. 6 depicts a method 130 for performing plausibility of the measurement of the capacitor sensor 12.

In operation 132, the measuring circuit 14 measures the impedance $Z_y[f_H]$ at the high frequency in the manner noted above (see equations (1)-(3) above). In addition, the measuring circuit 14 may simultaneously measure the impedance $Z_y[f_l]$ at the low frequency (see also equations (1)-(3) above). In this case, it may be necessary to assure the measurements (i.e., measuring the impedance $Z_y[f_H]$ and $Z_y[f_L]$) be performed simultaneously so a correlation between high and low frequencies can be established, especially in embedded environments with fast changing operating conditions and/or high electrical noise.

In operation 134, the measuring circuit 14 calculates (or determines) the capacitance $C_y[f_H]$ based on the measured impedance $Z_y[f_H]$. In general, as the frequency increases, it is possible to measure the capacitance better.

In operation 136, the measuring circuit 14 establishes the capacitance (or new capacitance value) $C_{y\_REF}[new]$ from $C_y[f_H]$ The capacitance $C_y[f_H][new]$ is generally a running average of previous values of $C_y[f_H][new]$ (e.g., at least one previous new capacitance value) (or $C_{y\_REF}$).

In operation 138, the measuring circuit 86 determines $C_{y\_REF}$ with the following equation: $(1-\beta)*C_{y\_REF}[old] + \beta*C_{y\_REF}[new]$. It is recognized that may be a value between 0 and 1. If $\beta$ is one, then $C_{y\_REF}$ is the same as that determined in connection with FIG. 5. If $\beta$ is zero, then $C_{y\_REF}$ is the same as $C_{y\_REF}$ as provided in connection with FIG. 4. The equation as set forth above generally represents an infinite impulse digital filter or IIR filter where the method 130 sets out to ensure that $C_{y\_REF}$ follows a smooth value to avoid noise corruption.

In operation 142, the measuring circuit 14 computes the resistance $R_y[f_L]$ and the capacitance $C_y[f_L]$ from $Z_y[f_L]$.

In operation 144, the measuring circuit 14 determines whether the capacitance $C_y[f_L]$ from operation 142 is greater than a first threshold such as $C_{y\_REF}-\Delta C_y$, (where $\Delta C_y$ is a programmable value) and less than a second threshold such as $C_{y\_REF}+\Delta C_y$. If this condition is true, then the method 130 moves to operation 146. If not, then the method 130 moves to operation 150.

In operation 146, the measuring circuit 14 indicates that the resistance $R_y[f_L]$ is valid. For example, in the event the capacitance $C_y[f_L]$ is greater than $C_{y\_REF}-\Delta C_y$ and less than $C_{y\_REF}+\Delta C_y$ (see operation 144), then this condition implies that the resistance $R_y[f_L]$ is valid.

In operation 148, the measuring circuit 14 indicates that the resistance $R_y[f_L]$ is invalid.

In operation 150, the measuring circuit 14 transmits at least one signal that the resistance $R_y[f_L]$ and the capacitance $C_y[f_L]$ are valid. Additionally, the measuring circuit 14 may provide (or transmit) a valid status or an invalid status for $R_y[f_L]$ over a data communication bus to another microcontroller on the vehicle or to a diagnostic tool.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for diagnosing a state of a capacitive sensor, the apparatus comprising:
    a measuring circuit for being electrically coupled to a capacitive sensor, the measuring circuit being configured to:
        measure a first impedance of the capacitive sensor at a first frequency;
        determine a first capacitance of the capacitive sensor at the first frequency based on the first impedance; and
        compare the first capacitance of the capacitive sensor to a first threshold and to a second threshold to perform diagnostics on the capacitive sensor,
    wherein the measuring circuit is further configured to measure a second impedance of the capacitive sensor at a second frequency that is greater than the first frequency while simultaneously measuring the first impedance of the capacitive sensor at the first frequency.

2. The apparatus of claim 1 wherein the measuring circuit is further configured to determine a second capacitance of the capacitive sensor at the second frequency based on the second impedance prior to determining the first capacitance of the capacitive sensor at the first frequency based on the second impedance.

3. The apparatus of claim 2 wherein the measuring circuit is further configured to set the second capacitance at the second frequency as a reference capacitance prior to comparing the first capacitance to the first threshold and to the second threshold.

4. The apparatus of claim 3 wherein the first threshold is based on the reference capacitance and a first programmable value and the second threshold is based on the reference capacitance and a second programmable value and wherein the first threshold is less than the second threshold.

5. The apparatus of claim 2 wherein the measuring circuit is further configured to determine a first new capacitance value of the capacitive sensor at the second frequency that is based on at least one of on a running average of at least one previous new capacitance value.

6. The apparatus of claim 5 wherein the measuring circuit is further configured to set first new capacitance at the second frequency to a reference capacitance prior to comparing the first capacitance to the first threshold and to the second threshold.

7. The apparatus of claim 6 wherein the first threshold includes the reference capacitance and a first programmable value and the second threshold includes the reference capacitance and a second programmable value and where the first threshold is less than the second threshold.

8. The apparatus of claim 1 wherein the measuring circuit is further configured to transmit a signal indicative of the capacitive sensor being valid in response to the first capacitance at the first frequency being greater than the first threshold and less than the second threshold.

9. The apparatus of claim 1 wherein the measuring circuit is further configured to determine a resistance of the capacitive sensor at the first frequency based on the first impedance.

10. The apparatus of claim 9 wherein the measuring circuit is further configured to transmit a signal indicative of the capacitive sensor being valid and being further indicative of the resistance of the capacitive sensor being valid in response to the first capacitance at the first frequency being greater than the first threshold and less than the second threshold.

11. A method for diagnosing a state of a capacitive sensor, the method comprising:
    measuring a first impedance of the capacitive sensor at a first frequency;
    determining a first capacitance of the capacitive sensor at the first frequency based on the first impedance;
    comparing the first capacitance of the capacitive sensor to a first threshold and to a second threshold to perform diagnostics on the capacitive sensor; and
    measuring a second impedance of the capacitive sensor at a second frequency that is greater than the first frequency while simultaneously measuring the first impedance of the capacitive sensor at the first frequency.

12. The method of claim 11 further comprising determining a second capacitance of the capacitive sensor at the second frequency based on the second impedance prior to determining the first capacitance of the capacitive sensor at the first frequency based on the second impedance.

13. The method of claim 12 further comprising setting the second capacitance at the second frequency as a reference capacitance prior to comparing the first capacitance to the first threshold and to the second threshold.

14. The method of claim 13 wherein the first threshold is based on the reference capacitance and a first programmable value and the second threshold is based on the reference capacitance and a second programmable value and wherein the first threshold is less than the second threshold.

15. The method of claim 11 further comprising transmitting a signal indicative of the capacitive sensor being valid in response to the first capacitance at the first frequency being greater than the first threshold and less than the second threshold.

16. The method of claim 11 further comprising determining a resistance of the capacitive sensor at the first frequency based on the first impedance.

17. The method of claim 16 further comprising transmitting a signal indicative of the capacitive sensor being valid and being further indicative of the resistance of the capacitive sensor being valid in response to the first capacitance at the first frequency being greater than the first threshold and less than the second threshold.

\* \* \* \* \*